United States Patent [19]

Philosophe

[11] Patent Number: 4,702,369
[45] Date of Patent: Oct. 27, 1987

[54] STORAGE CONTAINER FOR RECORDS OR THE LIKE

[75] Inventor: Isidore Philosophe, Brookline, Mass.

[73] Assignee: Cinram Ltd./Ltee., Scarborough, Canada

[21] Appl. No.: 824,508

[22] Filed: Jan. 31, 1986

[51] Int. Cl.$^4$ .............................................. B65D 85/57
[52] U.S. Cl. .................................... 206/312; 206/310; 206/309; 206/444; 312/10; 312/12; 312/14
[58] Field of Search ............... 206/444, 387, 312, 313, 206/309, 310, 311; 312/10, 12, 14, 311, 309, 326; 360/133

[56] References Cited

U.S. PATENT DOCUMENTS

| | | | |
|---|---|---|---|
| 508,932 | 11/1893 | Gage | 312/311 |
| 3,642,337 | 2/1972 | Manheim | 206/387 |
| 3,951,264 | 4/1976 | Heidecker et al. | 206/309 |
| 4,164,782 | 8/1979 | Stewart | 360/133 |
| 4,239,108 | 12/1980 | Coleman et al. | 360/133 |
| 4,316,539 | 2/1982 | Torrington | 360/133 |
| 4,463,849 | 8/1984 | Prusak et al. | 206/307 |
| 4,493,417 | 1/1985 | Ackeret | 206/387 |
| 4,520,470 | 5/1985 | d'Arc | 206/310 |
| 4,557,533 | 12/1985 | Koch | 312/14 |

FOREIGN PATENT DOCUMENTS

| | | | |
|---|---|---|---|
| 59429 | 9/1982 | European Pat. Off. | 206/387 |
| 160605 | 11/1985 | European Pat. Off. | 206/309 |
| 2612773 | 10/1976 | Fed. Rep. of Germany | 206/387 |
| 2649346 | 5/1978 | Fed. Rep. of Germany | 206/309 |
| 2143210 | 2/1985 | United Kingdom | 206/307 |

Primary Examiner—Stephen Marcus
Assistant Examiner—Brenda J. Ehrardt
Attorney, Agent, or Firm—Weldon F. Green

[57] ABSTRACT

A storage container or the like including a drawer-like receptacle and a pair of opposed, separable shell-like cover members for releasably supporting the drawer-like receptacle therewithin, each shell-like cover member presenting a mating edge formation to the other shell-like cover member with the mating edge formations including a recessed portion therein of a configuration and perimetral extent to define an access opening therebetween for passing the drawer-like receptacle therethrough, the shell-like cover members presenting means extending inwardly of the access opening for guiding the receptacle under displacement through the access opening and into substantially full registration within the opposed pair of shell-like cover members, and means for releasably securing the shell-like cover members together including a hinge and releasable clasp so arranged such that the shell-like cover members upon release of the clasp swing about the hinge to separate the edge formations and expose the receptacle, and shell-like cover members include a means for releasably anchoring a like storage container thereupon in superimposed registration.

12 Claims, 8 Drawing Figures

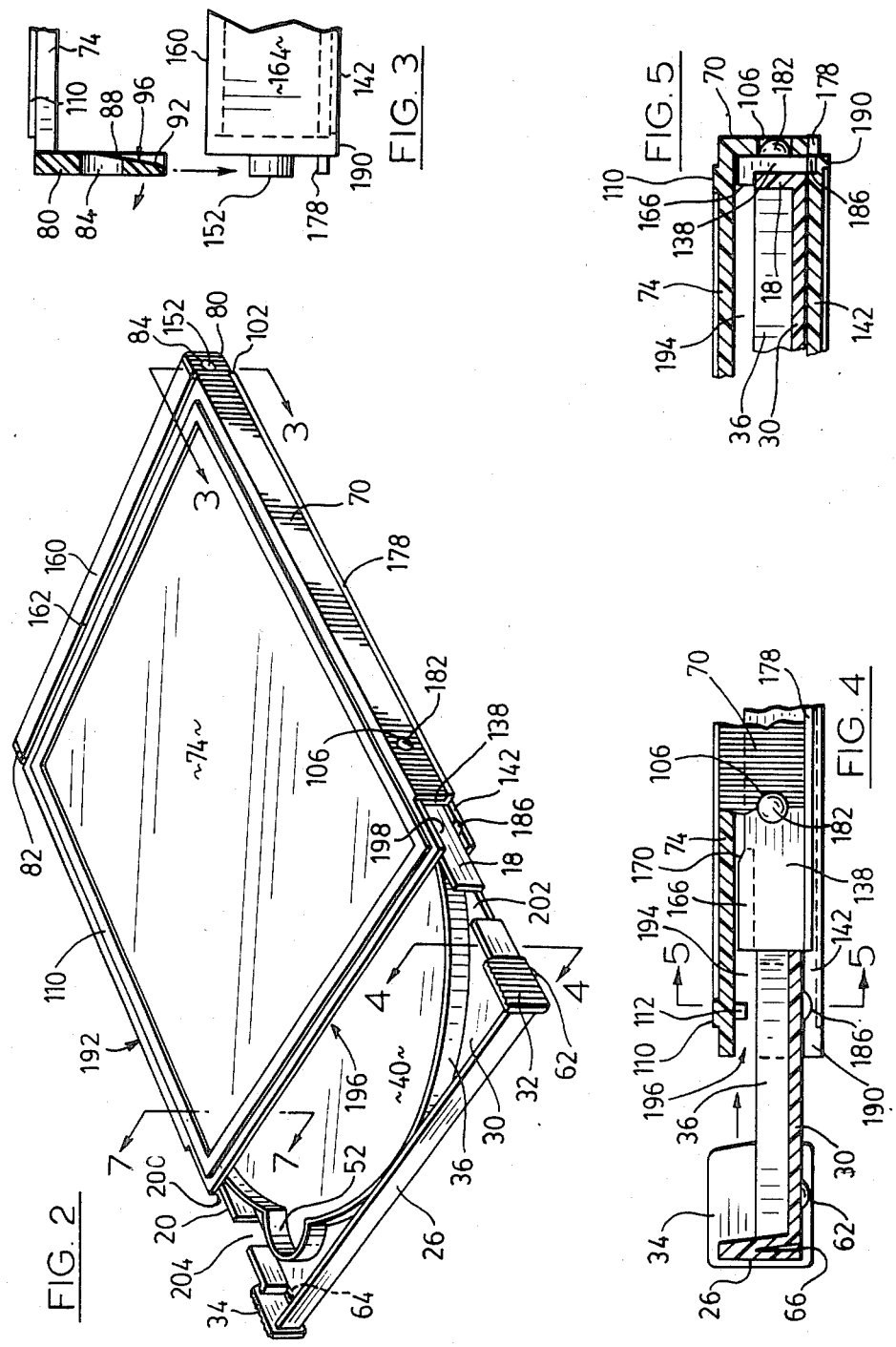

STORAGE CONTAINER FOR RECORDS OR THE LIKE

FIELD OF INVENTION

This invention relates to improvements in storage containers or the like, comprised of a drawer-like receptacle enclosed and supported in sliding fit within a hollow housing defined by a pair of opposed, mating, separable shell-like cover members in mating relation so as to provide, as compared with known alternatives, access to the contents of the container by either displacement of the drawer-like receptacle outwardly from the container, or by separating the opposed cover members exposing the receptacle and its contents therewithin.

More particularly, this invention relates to improvements in storage containers or the like for records, such as compact discs, such that when like containers are stacked one upon the other the drawer-like receptacles disposed in sliding fit within the hollow housings permit by displacement outwardly from the hollow housing access to the contents of a storage container located within a stack of like containers without removal of other like containers thereabove.

Further, the pair of opposed, mating, separable cover members in mating relation are free to swing about an axis from a closed position to a substantially open position, such that, if desired, the contents of the storage container are exposed without withdrawing the drawer-like receptacle therefrom.

BACKGROUND TO THE INVENTION

Storage containers for records falling within this category generally include panel or wall formations defining a cavity therewithin and means for retaining a record within the cavity presented by the container.

One example of an earlier container for a gramophone record is that found in U.S. Pat. No. 3,112,966 wherein suitable interlocking means are provided on the upper and lower faces of the container so that like containers can be stacked one upon the other, such that the containers cannot move in a fore and aft or side to side direction relative to one another.

Another prior alternative is U.S. Pat. No. 3,454,316 which is particularly directed to a gramophone record container formed from a base plate having a rib on three sides and a plastic drawer slideable in the fourth side. The front edge has in the center a semi-circular cut-out which facilitates the gripping of the record.

The record rests on a slideable drawer. The rear end of the drawer is bent upwards to such an extent that the rim presses against the under side of the cover plate and bounds the record within the inner space of the record container.

Projections of the drawer defined together with projections on the inside of the container bound the movement of the drawer in the fore and aft direction. The drawer further has projecting forwardly out of the container a strip which is somewhat wider than the introducing slit in the fourth side and is used primarily for introducing and removing the drawer from the container.

The transport of larger stacks of containers is provided by means of recesses on the sides of the containers which allow straps to be put around the containers in a crosswise manner. Further, pins can be inserted in the recesses to prevent slipping of the containers stacked one upon the other in a fore and aft and side to side direction.

Other containers wherein the record is retained in a tray member slideably mounted within the container for to and fro movement can be found in U.S. Pat. Nos. 4,138,703, 4,159,827, and 4,463,849.

In particular, U.S. Pat. No. 4,138,703 discloses a sleeve or jacket in which a slideable record tray moves in a fore and aft direction freely therethrough.

The tray includes a spine portion and an angular portion formed by a looped wire having its ends secured to the ends of the spine portion. The inner walls of the looped wire define an opening with a diameter slightly greater than the diameter of the record, a video disc, allowing access to both faces of the video disc. Both the tray and the video disc are supported within the jacket by the interior surfaces of the upper and lower panels of the jacket.

When the tray is fully inserted into the jacket the front portion of the spine extends into the access opening of the jacket enclosing same to keep dust or other contaminants from entering into the record enclosing cavity.

Further, the spine portion includes detent members which are received in depressions provided in the jacket for securing the tray within the jacket.

U.S. Pat. No. 4,159,827 discloses a jacket which contains therein a pair of channels for receiving a pair ribs of a record retaining tray in order to accurately locate the tray and the video disc within the access opening of the jacket. The ribs have wedge shaped end portions for leading the insertion of the tray into the jacket.

The ribs of the tray include a pair of detents which are received in depressions provided in the jacket when the tray is fully inserted into the jacket. The detents prevent inadvertent slippage of the tray member from the jacket.

In particular, U.S. Pat. No. 4,159,827 shows an alternative technique for retaining a record tray in an enclosure. The record retaining tray has opposed detent members which are disposed for cooperation with slideable members mounted within the enclosure for motion between an extended position forwardly of the front end of the tray and a depressed position.

When the slideable member is depressed the detent members are pushed inwardly permitting the tray to be removed from the enclosure. A spring biases the slideable member to occupy the extended position.

U.S. Pat. No. 4,463,849 discloses a further record retaining container comprising a spine removably located within an outer sleeve. The record retaining spine includes a circular opening in which a record, namely a video disc, is loosely received. The spine also includes a pair of latching members which selectively snap into respective pockets of the jacket to hold the assembly in place.

OBJECTS OF THE INVENTION

The principle object of this invention is to provide a light weight storage container with a slideable drawer-like receptacle enclosed in sliding fit by a pair of opposed, mating, separable, shell-like cover members in mating relation of the aforementioned type that includes an even simplified framework of cooperating components and elements as compared with the prior known structures identified herein or other alternatives, yet allows access to the contents of the container through either displacement of the drawer-like receptacle outwardly from the container or, by separating the pair of opposed cover members exposing the drawer-like receptacle disposed therewithin.

More particularly, it is a very important object of this invention to limit the number of required components to a minimum, to adopt the least complicated appropriate shaping for each utilizing known moulding methods, and to limit the number of connections to a minimum sufficient to preserve the integrity of the storage container while permitting the drawer-like receptacle to be slideably disposed therewithin, all of which promotes greater efficiency and keeps the cost of production down.

Still, another important object is to provide such storage containers with means which in combination with other like or compatible storage containers stacked one upon the other are readily secured against separation or displacement in either a fore and aft or side to side direction.

Still another very important object is to provide a storage container of the type and character indicated which will provide an attractive or pleasing appearance, setting a certain style or distinctiveness that commands attention and therefore likely to commend itself to collectors of records or the like.

FEATURES OF THE INVENTION

According to the invention, a storage unit or container is provided including a drawer-like rectacle, and a pair of opposed separable shell-like cover members for releasably supporting the drawer-like receptacle therewithin. Each such shell-like cover member presents a mating edge formation to the other shell-like cover member, with such mating edge formations including a recessed portion therein of a configuration and perimetral extent to define an access opening therebetween for passing the drawer-like receptacle therethrough.

More particularly, one of the features of this invention resides in providing a storage unit or container whose shell-like cover members carry a means extending inwardly of the access opening for guiding the drawer-like receptacle under displacement through the access opening and into substantially full registration within the pair of opposed shell-like cover members.

Still, more particularly, it is a feature of this invention to provide a storage unit or container of the type aforementioned wherein the means carried by the shell-like cover members extending inwardly of the access opening for guiding the receptacle under displacement include a pair of opposed flange formations slideably engaging the drawer-like receptacle.

It is another feature of this invention to provide a storage unit or container of the forementioned type wherein means are carried by the shell-like cover members for releasably securing same together against separation. More particularly, the means for releasably securing the shell-like cover members together include a hinge means and releasable claps means so arranged such that the shell-like cover members upon release of the clasp means swing about the hinge means to separate the edge formations and expose the receptacle therewithin.

Still, another feature resides in providing the storage unit or container with means carried by the drawer-like receptacle and shell-like cover members for releasably securing the receptacle into substantially full registration within the opposed pair of shell-like cover members.

Further, means are carried by the drawer-like receptacle and shell-like cover members for limiting displacement of the receptacle outwardly from registration within the opposed pair of shell-like cover members.

Still, more particularly, the means for releasably securing the receptacle into substantially full registration within the opposed pair of shell-like cover members include a further clasp means such that upon release of the clasp means the drawer-like receptacle can be displaced outwardly from the pair of shell-like cover members.

Further, the means for limiting displacement of the receptacle outwardly from registration within the opposed pair of shell-like cover members include upstanding projection formations of the drawer-like receptacle in abutting relation to depending projection formations extending inwardly of the access opening of the shell-like cover members to limit the outward extent that the drawer-like receptacle can be displaced from registration within the opposed pair of shell-like cover members.

It will be appreciated that storage units or containers of the type aforementioned may have shell-like cover members including means for releasably anchoring a like storage unit thereupon in superimposed registration.

These and other objects and features will become apparent upon reading the following description together with the illustration of a storage unit or container for a record embodying the invention appearing in the accompanying drawings.

THE DRAWINGS

FIG. 2 is a perspective view of the preferred embodiment of a storage container made in accordance with the invention taken from a point to the right and upwardly of the front end thereof wherein the upper and lower cover members are in closed mating relation defining a hollow housing and the drawer-like receptacle is shown partly withdrawn therefrom;

FIG. 3 is an exploded end elevational view taken along the lines 3—3 of FIG. 2 illustrating the hinged interconnecting of the socket members of the upper cover member to the projecting means of the lower cover member;

FIG. 4 is a side cross-sectional view taken along the lines 4—4 of FIG. 2 illustrating the relation of the upper cover member, drawer-like receptacle, and lower cover member when the upper cover member and lower cover member are in closed the mating relation defining a hollow housing with the drawer-like receptacle partly withdrawn therefrom;

FIG. 5 is a front cross-sectional view taken along the lines 5—5 of FIG. 4 showing the upper cover member releasably secured in the region of the front to the lower cover member and the relation of the drawer-like receptacle to the cover members when same are in closed mating relation defining a hollow housing;

THE PREFERRED EMBODIMENT OF THE INVENTION

Figure 1:
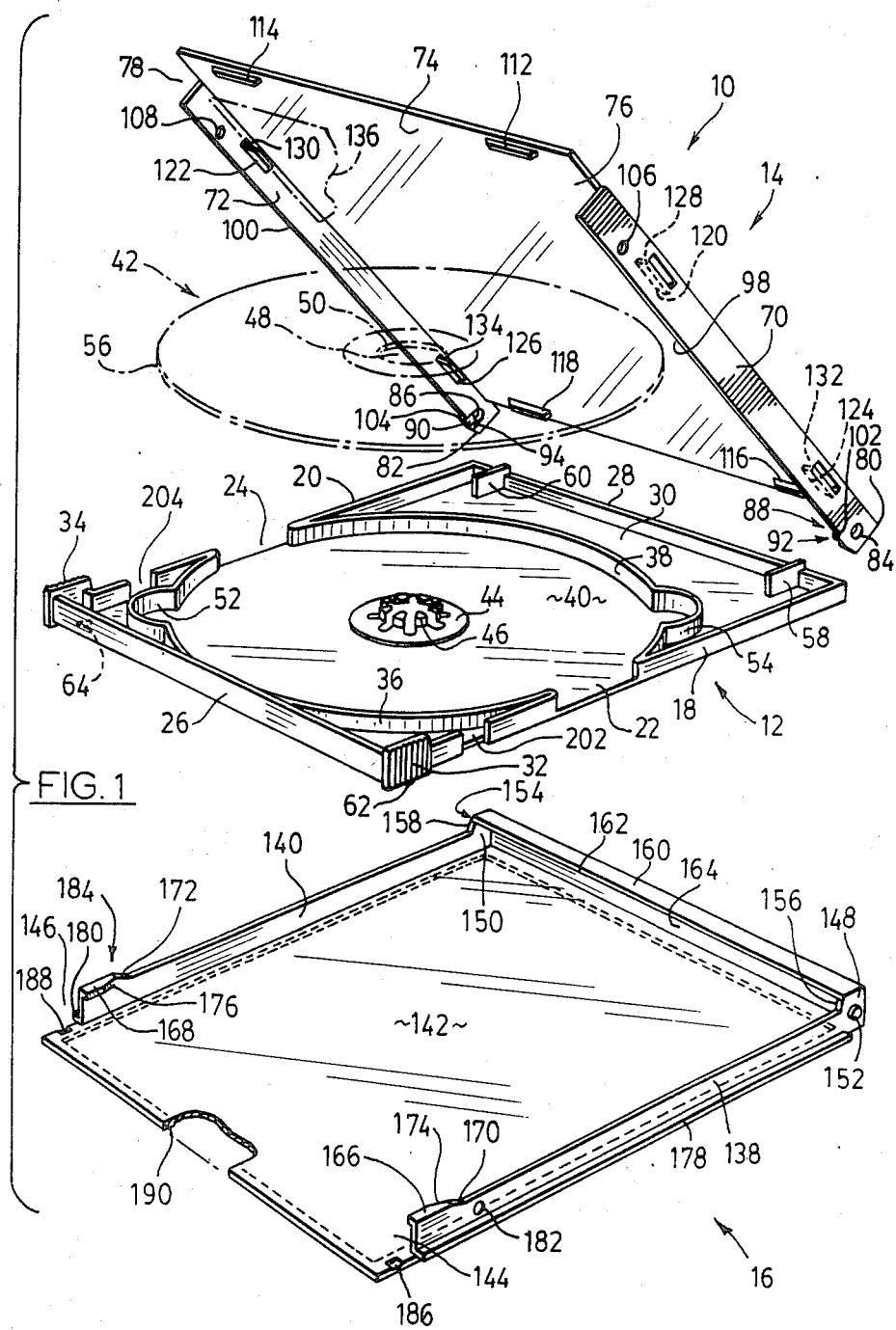
FIG. 1 is an exploded perspective view of the preferred embodiment of a storage container made in accordance with the invention taken from a point to the right and upwardly of the front end thereof wherein the upper cover member, drawer-like receptacle, and the lower cover member are shown separated in spaced apart relation to reveal their structures.

The storage container or the like illustrated by the several drawings is generally indicated at 10 and includes a substantially rectilinear drawer-like receptacle 12 enclosed and supported in sliding fit between a substantially rectilinear or shell-like upper cover member 14 and a substantially rectilinear or shell-like lower cover member 16, as best illustrated in FIG. 1.

Drawer-like receptacle 12 includes opposed, spaced apart side wall portions 18, 20 interrupted intermediately thereof by opposed, spaced apart recess formations 22, 24, respectively, a front wall portion 26, rear wall portion 28, and lower wall portion 30.

Further, side wall portions 18, 20 and front wall portion 26 present therebetween opposed outwardly facing serrated pad formations 32, 34 of such shape and configuration to facilitate the gripping of the drawer-like receptacle in the region of the front as will be hereinafter explained.

Side wall portions 18, 20 in the front and rear regions of oppposed, spaced apart recess formations 22, 24 present upstanding from the lower wall portion 30 substantially opposed front and rear curved formations 36, 38, respectively, extending from side to side of the drawer-like receptacle so as to form a substantially circular recess 40 therein having sufficient radius so that a record 42, such as a compact disc, can be retained therein.

Located centrally of opposed front and rear curved formations 36, 38 on the lower wall portion 30 within substantially circular recess 40 is a circular member 44 having upstanding part projection formations 46 located centrally thereof and arranged in a substantially circular formation of such diameter so as to fit securely within central aperture 48 of record 42 and bear against the inner edge 50 thereof securing record 42 within the circular recess 40 of drawer-like receptacle 12.

Opposed front and rear curved formations 36, 38, respectively further include offset forwardly and rearwardly opposed semi-circular outwardly extending protrusions 52, 54 having sufficient width and configuration to facilitate prehension of record 42 at its outer rim 56 for extracting same from the circular recess 40 of drawer-like receptacle 12.

Upstanding from lower wall portion 30 of drawer-like receptacle 12 in the region of the rear wall portion 28 are opposed, aligned projection formations 58, 60 terminating rearwardly in overlapping relation with rear wall portion 28 so as to extend vertically thereabove.

Presented in the region of the front on the undersurface of lower wall portion 30 near the opposed serrated pad formations 32, 34 are opposed, aligned bead formations 62, 64 for releasably securing the drawer-like receptacle 12 within the storage container 10 as will be hereinafter described.

Figure 7:
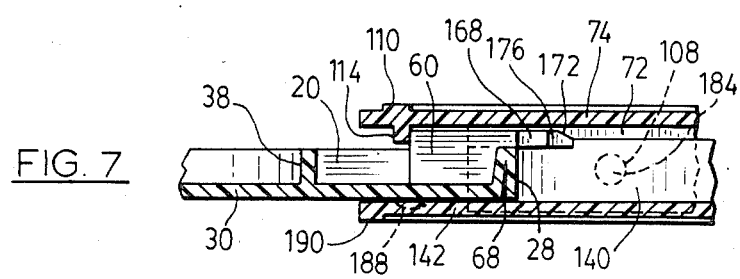
FIG. 7 is a side cross-sectional view taken along the lines 7—7 of FIG. 2 illustrating the relation of the upper cover member, drawer-like receptacle, and lower cover member when the upper cover member and lower cover member are in closed mating relation defining a hollow housing with the drawer-like receptacle fully withdrawn therefrom to a defined limit position.

The front wall portion 26 has located therein throughout its side to side extent introducing slit 66, as best illustrated in FIG. 4. Similarly, the rear wall portion 28 has located therein throughout its side to side extent an introducing slit 68, as best illustrated in FIG. 7. A label insert (not shown) can be inserted along its opposed, spaced apart ends within front and rear introducing slits 66, 68, respectively, such that it rests therebetween in underlying relation to the undersurface of lower wall portion 30. Further, the undersurface of lower wall portion 30 can present in the regions of the side wall portions 18, 20, depending ledge formations (not shown) of similar depth as the label insert to further maintain same in underlying relation to the drawer-like receptacle 12, secured in the regions of the front and rear within introducing slits 66, 68, respectively.

The label insert can present information regarding the contents of the storage container to the front, rear, and lower faces of the storage container, as will hereinafter become apparent.

Upper cover member 14 is comprised of opposed, spaced apart side wall portions 70, 72 and a top wall portion 74. Side wall portions 70, 72 in the region of the front of top wall portion 74 are rearwardly separated therefrom so as to define front recess formations 76, 78 therebetween. Further, side wall portions 70, 72 terminate rearwardly of the back end of top wall portion 74, in opposed, spaced apart socket members 80, 82 which include centrally located, opposed, aligned holes 84, 86.

Socket members 80, 82 present lowermost opposed, aligned, channel formations 88, 90 having inner surfaces 92, 94 tapering downwardly as at 96, as best illustrated in FIG. 3.

Socket members 80, 82 terminating lowermost in channel formations 88, 90 depend downwardly below the lower edges 98, 100 of opposed, spaced apart side wall portions 70, 72 and present therebetween opposed aligned bevels 102, 104.

Located forwardly on opposed, spaced apart side wall portions 70, 72 of upper cover member 74 are opposed, aligned holes 106, 108 for releasably securing the upper cover member 14 to the lower cover member 16 in the region of the front, as will be hereinafter described.

Extending throughout the entire perimetral extent of the upper surface of top wall portion 74 and spaced inwardly an equal distance from the front, rear, and side edges is an upstanding ledge like formation 110.

Located forwardly on the undersurface of the upper wall portion 74 of upper cover member 14 are downwardly depending projection formations 112, 114 in opposed, aligned, side to side extending relation. Similar projection formations 116, 118 depend downwardly from the top wall portion in the region of the rear in opposed, aligned, side to side extending relation.

Opposed spaced apart side wall portions 70, 72 of the upper cover member 14 present in the regions of the front and rear, respectively, opposed, aligned inwardly projecting tab formations 120, 122 and 124, 126, respectively, in spaced apart relation from the undersurface of top wall portion 74 presenting therebetween gaps 128, 130, and 132, 134, respectively.

Downwardly depending front projection formations 112, 114 and rear projection formations 116, 118 and side wall portions 70, 72 bound an area into which an information booklet 136 can be retained, secured within gaps 128, 130, and 132, 134 between the undersurface of top wall portion 74 and the front and rear opposed, aligned inwardly projecting tab formations 120, 122 and 124, 126, respectively.

The front projection formations 112, 114 and rear projection formations 116, 118 depend downwardly such an extent so that the information booklet can be passed thereover and inserted within the area bounded by the downwardly depending front projection formations 112, 114 and rear projection formations 116, 118 and side wall portions 70, 72 and register within gaps 128, 130 and 132, 134 presented between the undersurface of top wall portion 74 and tab formations 120, 122 and 124, 126, respectively.

Further, front projection formations 112, 114 depend downwardly a greater extent than rear projection formations 116, 118 for limiting the displacement of the drawer-like receptacle 12 outwardly from storage container 10, as will hereinafter be described.

Alternatively, the information booklet 136 can be inserted within the area defined on the undersurface of top wall portion 74 of upper cover member 14 by downwardly depending front and rear projection formations 112, 114 and 116, 118, respectively, and opposed side wall portions 70, 72 by aligning same thereover and distorting in a side to side direction so that the opposed side ends of information booklet 136 are presented to and register within gaps 128, 130 and 132, 134 presented between the undersurface of the top wall portion 74 and tab formations 120, 122 and 124, 126, respectively.

Lower cover member 16 is comprised of opposed, spaced apart side wall portions 138, 140 and a bottom wall portion 142. Side wall portions 138, 140 in the region of the front of bottom wall portion 142 are rearwardly separated therefrom so as to define recess formations 144, 146 therebetween having substantially the same extent when measured in the front to rear direction as recess formations 76, 78 of the upper cover member 14.

Side wall portions 138, 140 terminate rearwardly in opposed, spaced apart side wall portions 148, 150 which include centrally located opposed, aligned, outwardly extending projection formations 152, 154 having a diameter so as to be registrable within holes 84, 86 of socket members 80, 82 of upper cover member 14.

The opposed, spaced apart rear side wall portions 148, 150 of lower cover member 16 extend vertically upwardly greater than the opposed, spaced apart side wall portions 138, 140 presenting vertically extending forwardly facing edges 156, 158 therebetween.

Uppermost of the rear side wall portions 148, 150 in parallel, spaced part relation to the bottom wall portion 142 is top wall portion 160. Presented between the upper surface of top wall portion 160 and vertically extending forwardly facing edges 156, 158 of opposed spaced apart rear side wall portions 148, 150 is top bevel portion 162 extending throughout the entire side to side extent of top wall portion 160.

The opposed spaced apart rear side wall portions 148, 150 and parallel, spaced apart top and bottom wall portions 160, 142, respectively, terminate rearwardly in rear wall portion 164.

Further, the upper edges of the opposed, spaced apart side wall portions 138, 140 of lower cover member 16 present forwardly and upwardly thereof inwardly projecting opposed flange formations 166, 168. Flange formations 166, 168 and the upper edges of the opposed, spaced apart side wall portions 138, 140 present upper bevels 170, 172 and inner side bevels 174, 176 therebetween, respectively.

Presented lowermost throughout the front to rear extent of opposed, spaced apart side wall portions 138, 140 of lower cover formation 16 are outwardly projecting ledge formations 178, 180.

Further, side wall portions 138, 140 of lower cover member 16 present forwardly in matching relation to opposed aligned holes 106, 108 of side wall portions 70, 72 of upper cover member 14 corresponding opposed aligned bead formations 182, 184 for releasably securing the upper cover member 14 to the lower cover member 16 in the region of the front.

The lower wall portion 142 of the lower cover member 16 has located therein on its upper surface in the region of recesses 144, 146 opposed, aligned detents 186, 188 of matching configuration to opposed aligned bead formations 62, 64 on the undersurface of lower wall portion 30 of drawer-like receptacle 12 for releasably securing in the region of the front drawer-like receptacle 12 in registration within the lower cover member 16, and hence storage container 10, as will hereinafter be described.

Presented on the undersurface of lower wall portion 142 of lower cover member 16 substantially throughout the perimetral extent is a downwardly depending ledge-like formation 190 corresponding to upstanding ledge like formation 110 extending throughout the entire perimetral extent of the upper cover member 14.

The upstanding ledge-like formation 110 of the upper cover member 14 is of such configuration and extent so as to engage in mating relation the downwardly depending ledge-like formation 190 of the lower cover member 16.

Figure 6:
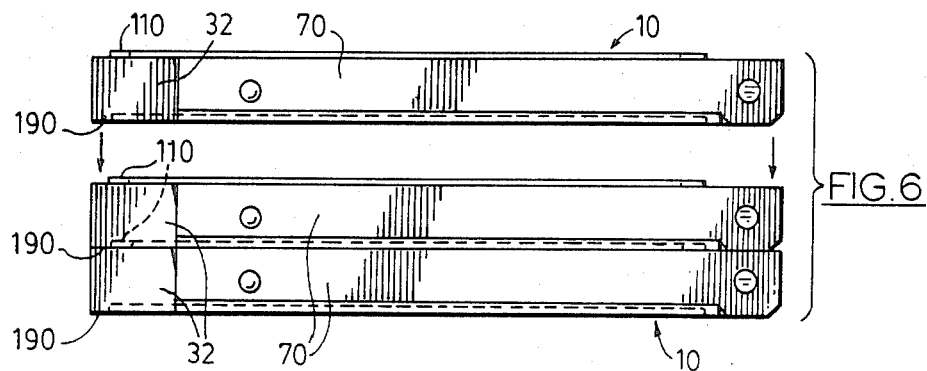
FIG. 6 is a side elevational view of a stack of like storage containers disposed one upon the other in overlying relation.

Particularly, the downwardly depending ledge-like formation 190 of a lower cover member 16 surrounds in abutting, mating relation the upstanding ledge-like formation 110 of an upper cover member presented therebelow, preventing relative displacement of the cover members with respect to one another in a force and aft or side to side direction, as best illustrated in FIG. 6.

Side wall portions 138, 140 and rear side wall portions 148, 150 of lower cover member 16 have an extent measured side to side throughout the front to rear direction less than the side to side extent of the side wall portions 70, 72 and socket members 80, 82, respectively, front to rear, of the upper cover member 14. Thus, when the upper cover member 14 substantially overlies the lower cover member 16 in mating relation with projection formations 152, 154 of rear side wall portions 148, 150 of the lower cover formation 16 presented within holes 84, 86 of socket members 80, 82 of the upper cover member 14 so as to present a storage container 10 in the form of a hollow housing 192 having a central cavity 194 therewithin, as best illustrated in FIGS. 2, 4 and 5, the outer side faces of side wall portions 138, 140 and rear side wall portions 148, 150 of lower cover member 16 are presented inwardly and adjacent to the inner side faces of side wall portions 70, 72 and socket members 80, 82, respectively, of upper cover member 14.

Further, the side wall portions 138, 140 of lower cover member 16 have a vertical extent less than the vertical extent of the side wall portions 70, 72 of the upper cover member 14 so that the upper cover member 14 can substantially overlie in overlapping relation the side wall portions 138, 140 of the lower cover member 16. More particularly, the lower edges 98, 100 of the side wall portions 70, 72 of the upper cover member 14 rest upon outwardly projecting ledges 178, 180 presented lowermost of the side wall portions 138, 140 of the lower cover member 16, providing support for the upper cover member 14 therebelow.

The rear edge of top wall portion 74 of upper cover member 14 is presented substantially adjacent the forwardly facing top bevel formation 162 of top wall portion 160 of lower cover member 16 when the upper cover member 14 substantially overlies in overlapping mating relation the lower cover member 16 so that a storage container 10 in the form of a hollow housing 192 of substantially rectilinear outline is presented having a cavity 194 located therein and bounded on the top, bottom, side and rear faces, and being open in the front as at 196.

When the upper cover member 14 substantially overlies in overlapping mating relation the lower cover member 16 so as to form a hollow housing 192, recess formations 76, 78 of the upper cover member 14 overlap recess formations 144, 146 of the lower cover member 16 coextensively so as to form opposed, aligned recesses 198, 200 in the region of the front of hollow housing 192.

To releasably secure the upper cover member 14 to the lower cover member 16 in the region of the rear of the storage container 10, socket members 80, 82 of the upper cover member 14 overlie and engage the rear side wallportions 148, 150 of lower cover member 16, as best illustrated in FIG. 3.

Particularly, channel formations 88, 90 of the socket members 80, 82 of the upper cover member 14 present tapered inward faces 92, 94 to the outwardly extending projection formations 152, 154 of the rear side wall portions 148, 150 of the lower cover member 16, and by exerting pressure downwardly upon socket members 80, 82 of upper cover member 14, projection formations 152, 154 force increasingly, gradually, outwardly socket members 80, 82 of the upper cover formation 14 so that projection formations 152, 154 can be readily directed towards holes 84, 86 of socket members 80, 82 by channel formations 88, 90 and register therein.

The downwardly tapering inner side faces 92, 94 of the channel formations 88, 90 of socket members 80, 82 enable outward pressure to be exerted in the regions of the lower edges thereof forcing socket members 80, 82 to bend outwardly so that holes 84, 86 disengage projection formations 152, 154 of the rear side wall portions 148, 150 of the lower cover member 16 releasing the upper cover member 14 from the lower cover member 16. When projection formations 152, 154 are abutting against the tapered inner side faces 92, 94 of the channel formations 88, 90 of socket members 80, 82 a component force upwardly is exerted upon the socket members 80, 82 facilitating the removal of the upper cover member 14 from the lower cover member 16.

Further, when the projection formations 152, 154 of the rear side wall portions 148, 150 of the lower cover member 16 register within holes 84, 86 of the socket members 80, 82 of the upper cover member 14 a horizontal axis is defined extending from side to side in the region of the rear about which the upper cover member 14 can be swung from a closed position in overlying, overlapping mating relation to the lower cover member 16 to a substantially open position.

In the closed position bevels 102, 104 of the channel formations 88, 90 of the upper cover member 14 are presented in near abutting relation to the rear ends of the outwardly projecting ledges 178, 180 of the side wall portions 138, 140 of the lower cover member 16 so as to complete the appearance of the side walls of the storage container yet permit the upper cover member 14 to swing from a closed position to a substantially open position.

When the upper cover member 14 has been swung to an open position such that the upper cover member 14 and the lower cover member 16 are 180° apart in coplanar relation the rear edges of socket members 80, 82 of upper cover member 14 abut against the rear edges of projecting edges 178, 180 respectively, of lower cover member 16 and limit the swinging movement of the upper cover member 14 from a closed position to an open position through a substantially 180° arc.

Further, upper cover member 14 can be releasably secured to the lower cover member 16 in the region of the front by the registering of the opposed, aligned bead formations 182, 184 forwardly of the side wall portions 138, 140 of the lower cover member 16 within the corresponding opposed, aligned holes 106, 108 presented forwardly of side wall portions 70, 72 of upper cover member 14 to form a releasable claps when same is in overlying, overlapping mating relation to the lower cover member 16, as best illustrated in FIG. 5.

In the manufacture and assembly of storage containers comprised of a drawer-like receptacle 12, enclosed by an upper cover member 14 releasably secured to a lower cover member 16, the cover members and drawer-like receptacle are all formed by known moulding techniques using a suitable plastic material such as clear styrene. The storage container is preferably transparent so that the information booklet 136 is visible through the upper wall portion 74 of the upper cover member 12 and the label insert is visible within front and rear introducing slits 66 and 68 of front and rear wall portions 26 and 28, respectively, of the drawer-like receptacle 12 and through the lower wall portion 142 and rear wall portion 164 of the lower cover member 16, as will become apparent.

Note that the upper bevel formations 170, 172 and inner side bevel formations 174, 176 presented between flange formations 166, 168 and side wall portions 138, 140, respectively, of the lower cover member 16, prevent fracturing of the flange formations 166, 168 by presenting inclined surfaces in the direction of the removal of the lower cover member 16 from the mould, yet impart greater structural strength and reduce wear to the flange formations since the number of sharp edges of corners is kept to a minimum.

In the assembly of storage containers made in accordance with this invention the upper cover member 14 is releasably secured to the lower cover member 16 by lowering and securing same in overlying, overlapping mating relation to the lower cover member, as described hereinbefore. The upper cover member 14 is then swung to the open limit position, in coplanar relation substantially 180° to the lower cover member 16 and the information booklet 136 is properly orientated and inserted within the area bounded by the downwardly depending front projections 112, 114 and rear projections 116, 118 respectively and side wall portions 70, 72 so as to register within gaps 128, 130 and 132, 134 presented by front and rear tab formations 120, 122 and 124, 126 respectively, and the upper wall portion 74 as hereinbefore described.

The insert label is then orientated and inserted within front and rear introducing slits 66 and 68, respectively, of the drawer-like receptacle 12 as hereinbefore described. The drawer like receptacle 12 is then placed in aligned, overlying relation to the exposed area defined by the opposed, spaced apart side wall portions 138, 140 bottom wall portion 142, and top, forward bevel formation 162 of the top wall portion 160 of the lower cover member 16.

Drawer-like receptacle 12 further has opposed, aligned recess formations 202, 204 interrupting side wall portions 18, 20 throughout the entire vertical extent forwardly of opposed, spaced apart recess formations 22, 24. Opposed, aligned recess members 202, 204 are of matching extent in the front to rear direction as opposed, aligned inwardly projecting flange formations 166, 168 disposed upwardly forwardly of the side wall portions 138, 140 of lower cover member 16.

Further, the front side wall portions 18, 20 of drawer-like receptacle 12 have an extent measured side to side, front to rear, less than the side to side extent of the side wall portions 138, 140 and rear side wall portions 148, 150 of lower cover member 16 such that the drawer like receptacle 12 can register in sliding fit within the area defined by the opposed aligned side wall portions 138, 140, opposed, aligned rear side wall portions 148, 150 and rear wall portion 164, of lower cover member 16, and further have a vertical extent so as to register in sliding fit between opposed, parallel top wall portion 160 and bottom wall portion 142 of lower cover member 16.

Thus, drawer-like receptacle 12 can be lowered onto the upper surface of lower wall portion 142 of lower cover member 16 in the assembly of storage containers utilizing this invention by aligning opposed, aligned recess formations 202, 204 in the side wall portions 18, 20 of drawer-like receptacle 12 over opposed aligned flange formations 166, 168 of lower cover member 16, and lowering the drawer-like receptacle 12 such that the flange formations 166, 168 pass through the recess formations 202, 204. Displacing the drawer-like receptacle 12 rearwardly such that the flange formations 166, 168 extend over side wall formations 18, 20 of the drawer-like receptacle 12 slideably engages the drawer-like receptacle 12 in registration within the lower cover member 16, as best illustrated in FIG. 5.

The upper cover member 14 can then be swung from the limit open position in coplanar relation 180° to the lower cover member 16 to a closed position so as to present a storage container 10 in the form of a hollow housing 192 including a drawer-like receptacle 12 slideably disposed in registration within cavity 194 of the hollow housing 192 through the open front end at 196.

To secure the drawer-like receptacle 12 within cavity 194 of the hollow housing 192 the aligned bead formations 62, 64 provided on the undersurface of side wall portions 18, 20 slideably engage within opposed aligned detents 186, 188 provided in the upper surface of bottom wall portion 142 of lower cover member 16 in the region of recesses 144, 146.

When the drawer-like receptacle 12 is releasably secured within hollow housing 192 the opposed, aligned serrated pad formations 32, 34 of the drawer-like receptacle 12 fully register within recesses 198, 200 formed by the overlapping of the opposed, aligned recess formations 76, 78 of the upper cover member 14 with the opposed, aligned recess formations 144, 146 of the lower cover member 16.

Further, the front wall portion 26 of the drawer-like receptacle 12 is of such a vertical extent so as to fully register within the front opening 196 of the hollow housing 192 and in combination with the opposed, aligned serrated pad formations 32, 34 fully registered within recesses 198, 200 when the drawer-like receptacle 12 is releasably secured in fully registration within the hollow housing 192, the storage container 10 presents a substantially closed external appearance of compact design of substantially rectilinear configuration.

To disengage the drawer-like receptacle 12 from registration within cavity 194 of hollow housing 192 the opposed serrated pad formations 32, 34 are grasped and pulled causing the drawer-like receptacle 12 to pass through opening 196 outwardly from cavity 194 of the hollow housing 192. Opposed, aligned bead formations 62, 64 of the drawer-like receptacle 12 slideably disengage opposed, aligned detents 186, 188 of lower cover member 16.

To limit the outward extension of drawer-like receptacle 12, opposed aligned upstanding projection formations 58, 60 from lower wall portion 30 terminating rearwardly in overlying relation with rear wall portion 28 abut with downwardly depending projection formations 112, 114 in the region of the front of top wall portion 74 of upper cover member 14, as best illustrated in FIG. 7.

The storage container 10 thus provides means for releasably securing in sliding fit in registration therewithin the drawer-like receptacle 12 while permitting access to the contents retained therein by either displacement of the drawer-like receptacle 12 outwardly from the hollow housing 192 or by releasing the upper cover member 14 from the lower cover member 16 exposing the drawer-like receptacle in registration therewithin.

Particularly, the upper cover member 14 is released from the lower cover member 16 in the region of the front and swung about an axis from a closed position in overlying, overlapping mating relation to a substantially open position to expose the drawer-like receptacle therewithin.

Note further that front and rear tab formations 120, 122 and 124, 126, respectively, of upper cover member 14 can overlie in sliding fit the upper edges of side wall portions 18, 20 of drawer-like receptacle 12 when the upper cover member 14 is in overlying mating relation to the lower cover member 16 with the drawer-like receptacle enclosed and supported in sliding fit therebetween and thus aid flange formations 166, 168 in guiding the displacement of the drawer-like receptacle 12 outwardly therefrom.

Figure 8:
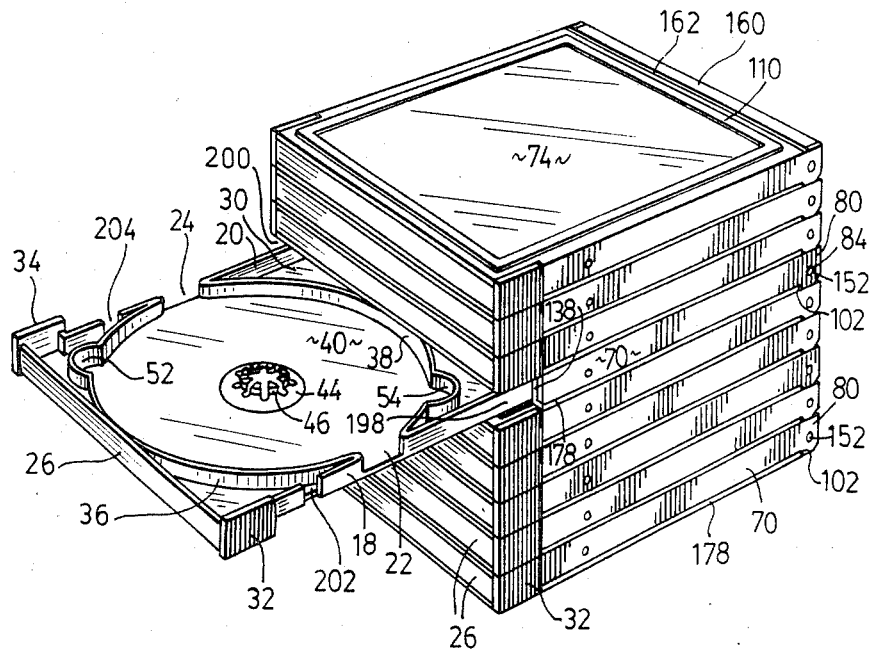
FIG. 8 is a perspective view of a stack of like storage containers disposed one upon the other in overlying relation taken from a point to the right and upwardly of the front end thereof showing a drawer-like receptacle of a storage container located intermediately of the stack fully withdrawn therefrom to the limit position illustrated in FIG. 7.

Further, as illustrated in FIGS. 6 and 8, the storage container 10 can be stacked one upon the other in overlying relation such that the ledge-like formation 110 upstanding from the upper surface of top wall portion 74 of the upper cover formation 14 registers in abutting relation within ledge-like formation 190 depending downwardly from the lower surface of the bottom wall portion 142 of the lower cover formation 16 so as to prevent relative displacement of like storage containers 10 stacked one upon the other in the fore and aft and side to side direction.

Further, it can be seen that the drawer-like receptacle 12 releasably secured in sliding fit within the hollow housing 192 of storage container 10 permits access to the contents contained by the drawer-like receptacle 12 when same is in registration within a storage container located within a stack of like containers, as illustrated in FIGS. 6 or 8, without necessitating the removal of like or similar storage containers thereabove. The drawer-like receptacle is simply displaced outwardly from the container to the limit position defined by the upstanding opposed, aligned projection formations 58, 60 terminating rearwardly in overlying relation to the rear wall 28 of the drawer-like receptacle 12 in abutting relation with the downwardly depending projection formations 112, 114 of the top wall portion 74 of the upper cover formation 14. The record 42 can then be removed from the circular recess 40 of drawer-like receptacle 12 at the prehension of same by its outer rim 56 through either the offset, forwardly and rearwardly opposed semicircular extending protrusions 52, 54, or through opposed spaced apart recess formations 22, 24.

Note that when the drawer-like receptacle 12 is releasably secured in full registration within the hollow housing 192 of storage container 10 and the upper cover member 14 is swung from the closed position to a substantialy open position exposing the drawer-like receptacle 12 therewithin only the offset, forwardly and rearwardly opposed semi-circular outwardly extending protrusions 52, 54 provide means for the prehension of record 42 at its outer rim 56 for extractng same from the circular recess 40 of drawer-like receptacle 12.

Finally, it will understood that variations or alternatives may be introduced or included to the storage container described and illustrated by those persons skilled in this field without departing from the spirit or scope of the invention defined by the appended claims.

What we claim is:

1. In a storage unit or the like, a drawer-like receptacle, a pair of opposed separable shell-like members for releasably supporting said drawer-like receptacle therewithin, each said shell-like member presenting a mating edge formation to the other of said shell-like members, said mating edge formation including a recessed portion therein of a configuration and perimetral extent to define an access opening therebetween for passing said drawer-like receptacle therethrough, guide means carried by at least one of said shell-like members and extending inwardly of said access opening for guiding said receptacle under displacement through said access opening and into substantially full registration within said opposed pair of shell-like members to define an enclosed unit with said receptacle and for permitting the withdrawal of said receptacle to at least an extent as to provide access to the interior thereof, and hinge means on said shell-like members for pivoting said members away from each other to a substantially open position to expose said drawer-like receptacle registered therein.

2. A storage unit according to claim 1 wherein said shell-like members include a releasable clasp means for securing said shell-like members in mating formation and upon release for releasing said members for pivoting away to a substantially open position.

3. A storage unit according to claim 1 or 2 wherein said sheel-like members include means for releasably anchoring a like storage unit thereupon in superimposed registration.

4. A storage unit or the like including a drawer-like receptacle and a pair of opposed separable shell-like cover members for releasably supporting said drawer-like receptacle therewithin, each said shell-like cover member presenting hingedly connecting means at one end thereof for swinging movement about said hinge means from a closed position wherein each said cover member presents a mating edge formation to the other said cover member to define an enclosed unit with said receptacle, to a substantially open position to expose said drawer-like receptacle registered therein, said mating edge formations including a recessed portion therein of a configuration and perimetral extent to define an access opening therebetween for passing said drawer-like receptacle therethrough, guide means carried by said cover members extending inwardly of said access opening for guiding said receptacle under displacement through said access opening and into substantially full registration within said opposed pair of shell-like cover members and for withdrawing said receptacle to at least an extent as to provide access to the interior thereof, means carried by said drawer-like receptacle and said shell-like cover members for releasably securing said receptacle with substantially full registration within said opposed pair of shell-like cover members, and means carried by said drawer-like receptacle and said shell-like cover members for limiting displacement of said receptacle outwardly from registration within said opposed pair of shell-like cover members.

5. A storage unit according to claim 4 wherein said pair of shell-like cover members present at the other end thereof releasable clasp means such that said cover members upon release of said clasp means swing about said hinge means to separate said edge formations and expose said receptacle.

6. A storage unit according to claims 4 or 5 wherein said means for releasably securing said receptacle into substantially full registration within said opposed pair of shell-like cover members include a second clasp means such that upon release of said clasp means said drawer-like receptacle can be displaced outwardly from said pair of shell-like cover members.

7. A storage unit according claims 4 or 5 wherein said means for limiting displacement of said receptacle outwardly from registration within said opposed pair of shell-like cover members include upstanding projection formations of said drawer-like receptacle in abutting relation to depending projection formations extending inwardly of said access opening of said shell-like cover members to limit the outward extent that said drawer-like receptacle can be displaced from registration within said opposed pair of shell-like cover members.

8. A storage unit according to claims 4 or 5 wherein said shell-like cover members include means for releasably anchoring a like storage unit thereupon in superimposed registration.

9. A storage unit or the like including, a drawer-like receptacle of substantially rectilinear outline and a pair of opposed separate cover members of substantially rectilinear outline for releasably supporting said drawer-like receptacle therewithin, each said cover member presenting hingedly connecting means at one end thereof and releasable clasp means at the other end such that said cover members upon release of said clasp mens swing about said hinge means from a closed position wherein each said cover member presents a mating edge formation to the other said cover member to define an enclosed unit with said receptacle, to a substantially open position to expose said drawer-like receptacle registered therein, said mating edge formations including a recessed portion therein of a configuration and perimetral extent to define an access opening therebetween for passing said drawer-like receptacle therethrough, guide means carried by said cover members extending inwardly of said access opening for guiding said receptacle under displacement through said access opening and into substantially full registration within said opposed pair of shell-like cover member and for withdrawing said receptacle to at least an extent as to provide access to the interior thereof, means carried by said drawer-like receptacle and said cover members for releasably securing said receptacle into substantially full registration within said opposed pair of cover members, and means carried by said drawer-like receptacle and said members for limiting displacement of said receptacle outwardly from registration within said opposed pair of cover members.

10. A storage unit according to claim 9 wherein said means for releasably securing said receptacle into substantially full registration within said opposed pair of cover members include a second clasp means such that upon release of said clasp means said drawer-like receptacle can be displaced outwardly from said pair of cover members.

11. A storage unit according to claim 9 or 10 wherein said means for limiting displacement of said receptacle outwardly from registration within said opposed pair of cover members include upstanding projection formations of said drawer-like receptacle in abutting relation to depending projection formations extending inwardly of said access opening of said shell-like cover members to limit the outward extent that said drawer-like receptacle can be displaced from registration within said opposed pair of cover members.

12. A storage unit according to claim 9 or 10 wherein said cover members include means for releasably anchoring a like storage unit thereupon in superimposed registration.

* * * * *